United States Patent [19]
Toyoda et al.

[11] 4,097,645
[45] Jun. 27, 1978

[54] SYNTHETIC PAPER HAVING GOOD INK ADHESION THERETO

[75] Inventors: Takashi Toyoda; Yoshio Miyabe; Masaaki Yamanaka, all of Ibaraki, Japan

[73] Assignee: Oji Yuka Goseishi Kabushiki Kaisha, Tokyo, Japan

[21] Appl. No.: 844,482

[22] Filed: Oct. 21, 1977

[30] Foreign Application Priority Data

Oct. 22, 1976 Japan .................................. 51-126941

[51] Int. Cl.² ............................ B32B 3/26; B32B 5/25
[52] U.S. Cl. ..................................... 428/306; 156/229; 428/910; 428/474
[58] Field of Search ................ 156/229; 428/304, 305, 428/306, 308, 309, 910, 474

[56] References Cited

U.S. PATENT DOCUMENTS

| 3,843,479 | 10/1974 | Matsunami et al. | 428/910 |
| 3,922,427 | 11/1975 | Toyoda et al. | 428/309 |
| 3,963,851 | 6/1976 | Toyoda | 428/305 |

Primary Examiner—William J. Van Balen
Attorney, Agent, or Firm—Wenderoth, Lind & Ponack

[57] ABSTRACT

A synthetic paper having good ink adhesion thereto which comprises:
A. a synthetic paper substrate comprising a papery layer which is a stretched resin film which contains fine filler particles dispersed therein and has microvoids dispersed therein and surface ruptures thereon; and
B. a layer for improving ink adhesion to the synthetic paper which is provided on at least one surface of the papery layer and comprises, as an essential constituent, an ethyleneimine adduct of a polyaminepolyamide.

13 Claims, 2 Drawing Figures

SYNTHETIC PAPER HAVING GOOD INK ADHESION THERETO

BACKGROUND

FIELD OF THE ART

This invention relates generally to synthetic papers coated with agents for improving ink adhesion thereto and more particularly to a synthetic paper having a layer containing an ethyleneimine adduct of a polyaminepolyamide as an agent for improving ink adhesion. More specifically, the invention relates to a synthetic paper of the character referred to above which is produced without incurring dusting trouble in the process of applying as a coating an aqueous solution of a polyaminepolyamide-ethyleneimine adduct on the papery layer surface of the synthetic paper which has, as the papery layer, a stretched resin film containing a filler (hereinafter referred to as "filled stretched film" for brevity).

Various types of synthetic papers comprising synthetic resin film rendered into paper-like form to take the place of cellulose papers comprising cellulose fibers in intertwined state have been proposed. One group of such synthetic papers has filled stretched film as a papery layer. Among the synthetic papers of this group, there are those of single-layer structure comprising only a papery layer of this character and, in addition, those of a laminated structure wherein a papery layer of this character is bonded onto at least one side of a substrate or inner layer, as disclosed in Japanese Patent Publication No. 40794/1971, U.S. Pat. Nos. 3,799,828 and 3,741,841.

Excellent paperiness of a synthetic paper having a filled stretched film of this character as its papery layer is realized by the presence of fine voids or microvoids formed about the filler particles as centers. While these microvoids are uniformly distributed or dispersed across the papery layer in the direction of its thickness, those at the outer surface and those in the vicinity of the outer surface are communicative with the region outside of the papery layer. The papery layer thus has surface ruptures. This communicative state of the voids with the outside and, moreover, the exposed state of the filler particles result from the stretching of film of a resin containing fine filler particles. Because of this characteristic, the synthetic papers of this group inherently have good printability or ink receptability (or ink absorbency) and ink drying characteristic.

If this generally good printability could be further improved, and if particularly the ink adhesion could be improved to an even greater extent, the practical usefulness of this group of synthetic papers would increase even more.

The method of applying as a coating an aqueous solution comprising a polyethyleneimine on a polyolefin film which has been subjected to oxidation treatment and drying the resulting coating thereby to improve the adhesion thereto is known (as disclosed in the specification of Japanese Patent Publication No. 12302/1965). We have discovered that when an aqueous solution of a polyethyleneimine is applied as coating on the papery layer surface of a synthetic paper having a filled stretched film as a papery layer and is dried, the ink adhesion of this synthetic paper is improved.

However, the characteristic of the aforementioned surface voids or ruptures of a synthetic paper having a filled stretched film as a papery layer gives rise to a problem at the time of coating thereof with an aqueous solution of a polyethyleneimine. That is, the filler particles exposed at the outer surface of the film peel off from the surface of the papery layer and causes a kind of dusting trouble.

More specifically, in order to apply as a coating on the papery layer the aqueous solution of the polyethyleneimine for forming a polyethyleneimine layer on the papery layer outer surface, the papery layer is ordinarily caoused to contact the aqueous solution of the polyethyleneimine directly or indirectly by way of means such as a transfer roll. However, when this coating work is continued for a long time, a white precipitate is formed in the aqueous polyethyleneimine bath, whereby uniform coating becomes difficult. This white precipitate is formed as a result of the filler particles exposed at the papery layer surface peeling off from the papery layer surface, entering into the bath of the aqueous solution of the polyethyleneimine, and being aggregated or flocculated by the polyethyleneimine.

Consequently, it is difficult to practice industrially the process of coating an aqueous solution of a polyethyleneimine on the papery layer of a synthetic paper having a filled stretched film as a papery layer.

As a polymer material for improving the ink adhesion which does not give rise to aggregation of peeled off filler, there should be materials other than polyethyleneimines. However, in the selection of such a material, consideration must be given also to point of not unduly impairing the properties of the treated synthetic paper as a paper and the characteristics related to printing in addition to the effect of improving the ink adhesion. In this connection, the polyethyleneimine layer formed on the synthetic paper exhibits good ink adhesion in parts thereof bearing printing ink, but, in other parts, the characteristic of this synthetic paper as paper is lost, and, moreover, the polyethyleneimine layer tends to cause the paper to become sticky.

SUMMARY

It is an object of this invention to provide solutions to the above described problems by using an ethyleneimine adduct of a polyaminepolyamide as an agent for improving ink adhesion formed on the surface of the papery layer of a synthetic paper.

Accordingly, the synthetic paper of good ink adhesion according to this invention is characterized in that it comprises; (A) a synthetic paper substrate having a filled stretched film with surface ruptures thereon as a papery layer and (B) a layer for improving ink adhesion provided on the outer surface of this papery layer, and this layer for improving ink adhesion comprises principally an ethyleneimine adduct of a polyaminepolyamide.

Thus, in accordance with this invention, a specific polymer, which is essentially water soluble, is coated on the papery layer of a synthetic paper of a specific construction, whereby a kind of dusting trouble which is uniquely possessed by this synthetic paper of the specific construction is successfully solved.

More specifically, in accordance with this invention, a specific ethyleneimine adduct is used as the agent for improving ink adhesion. This ethyleneimine adduct exhibits good ink adhesion, and, at the same time, since an aqueous solution thereof does not aggregate any peeled filler particles coating over a long time is possible. Furthermore, a synthetic paper provided with this ethyleneimine adduct layer retains substantially its original papery characteristics and is not accompanied by stickiness.

In addition, a synthetic paper coated on its surface with this ethyleneimine adduct possesses very good adhesion thereto of an aqueous adhesive or an aqueous ink. For this reason, it has become possible to use adhesives and inks for natural papers which were heretofore considered to be unusable for known synthetic papers because of their almost complete lack of water absorptivity.

The nature, utility, and further features of this invention will become more clearly apparent from the following detailed description beginning with a consideration of general aspects of the invention and concluding with specific examples of practice constituting preferred embodiments of the invention.

DRAWINGS

In the drawings:

FIG. 1 is a fragmentary, greatly enlarged, sectional view of a synthetic paper provided with a layer for improving ink adhesion on one surface of its synthetic paper substrate comprising only a papery layer; and FIG. 2 is a similar view of a synthetic paper provided with layers for improving ink adhesion on both surfaces of its synthetic paper substrate comprising a three-ply structure.

DETAILED DESCRIPTION

1. Synthetic Paper

Figure 1:
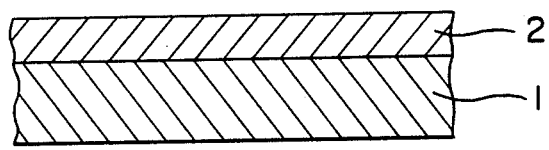

The synthetic paper in the present invention has a filled stretched film as a papery layer.

In one group of synthetic papers of this type, the synthetic paper is of single-ply structure comprising a resin film containing a filler which has been stretched in the direction of one axis or the directions of two axes.

In another group, the synthetic paper is of laminated structure comprising a substrate layer and a papery layer of the above mentioned character bonded onto at least one surface of the substrate layer. A typical example of a synthetic paper of this laminated structure is that wherein the papery layer has been uniaxially stretched, and has surface ruptures thereon and the substrate layer has been biaxially stretched. This synthetic paper can be produced by extruding as a laminate layer a resin containing a filler on at least one surface of a resin film (which may contain a small quantity of a filler) which has been stretched to a length which is at least 1.3 times the original length along a longitudinal axis and stretching this laminated structure to a width which is at least 2.5 times the orginal width along the transverse axis perpendicular to the longitudinal axis to form surface ruptures thereon, as disclosed in the above-referred specification of Japanese Patent Publication No. 40794/1971 and the like.

In either case, various stretchable thermoplastic resins, particularly those which undergo molecular orientation upon being stretched, can be used singly or as mixtures as the synthetic resin for the film. Specific examples of these resins are: polyolefin resins such as homopolymers and copolymers of ethylene, propylene, butene-1, and the like; polyamide resins; polyester resins such as polyethylene terephthalate; polyvinyl and polyvinylidene resins such as homopolymers and copolymers of vinyl chloride and vinylidene chloride; and homopolymers and copolymers of styrene.

In a synthetic paper of laminated structure, the resins of the different layers may be the same or different. The filler is ordinarily an inorganic powder, specific examples being clays, talc, asbestos, gypsum, barium sulfate, calcium carbonate, titanium oxide, zinc oxide, magnesium oxide, diactomaceous earth, and silicon oxide. The particle size of the filler is ordinarily of the order of 0.5 to 30 microns. The filler content may be of any value provided that it is sufficient to produce ample paperiness of the papery layer, but is ordinarily of the order of 5 to 60 percent by weight, particularly 25 to 60 percent by weight, in a papery layer of a laminated structure as described above.

The printability of the outer surface of the papery layer can be further improved by subjecting this surface to oxidation treatment or some other suitable treatment.

2. Ethyleneimine Adduct

The agent for improving ink adhesion used in this invention is a water-soluble resin which results from the addition of ethyleneimine to a polyaminepolyamide.

1. polyamine polyamide

A polyaminepolyamide to which the ethyleneimine is to be added is obtained by a condensation reaction of a dicarboxylic acid and a polyalkylenepolyamine.

a. Dicarboxylic acid

For this dicarboxylic acid, in general, a saturated or unsaturated, aliphatic (inclusive of the alicyclic) or aromatic, dibasic dicarboxylic acid of a number of carbon atoms of the order of 3 to 10 can be used singly or as a mixture and may have a substituent provided that it is not counter to the purport of this invention.

A saturated aliphatic carboxylic acid having 4 to 8 carbon atoms or phthalic acid is preferable, and from the standpoint of economy, adipic acid is particularly preferable.

b. Polyalkylenepolyamine

Various kinds of polyalkylenepolyamines with alkylene moieties each having 2 to 4 carbon atoms, particularly polyethylenepolyamines, polypropylenepolyamines, polybutylenepolyamines, and the like are used. The degree of polymerization or condensation of the "monomeric alkyleneamine" is ordinarily up to the order of a number of tens to a number of hundreds, and usually up to 10.

For reasons principally of economy, polyethylenepolyamines are suitable, and polyethylenepolyamines whose degree of condensation of "momeric" ethylene diamine is up to about 10, or preferably up to about 6, are more suitable. Specific examples are diethylenetramine, triethylenetetramine, and tetraethylenepentamine.

C. Formation of polyamide

The formation of a polyaminepolyamide due to the reaction of the dicarboxylic acid and the polyalkylenepolyamine may be carrried out by the direct dehydrationamidation of the two reactants, by dealcoholamidation by using the dicarboxylic acid as an ester, or by any other appropriate method.

The reaction temperature, in the case of direct reaction of the carboxylic acid and the polyalkylenepolyamine, varies from approximately 110° C up to approximately 250° C at atmospheric pressure, but a temperature between approximately 160° C and approximately 210° C is ordinarily suitable.

The molar ratio of the polyalkylenepolyamine to the dicarboxylic acid is ordinarily from 0.8:1.0 to 1.4:1.0. When this molar ratio is less than 0.8:1.0, products which have gelled or products with high tendency to gel are easily formed. On the other hand, when this molar ratio exceeds 1.4:1.0, polyamides of low molecuar weight are easily formed.

A polyaminepolyamide suitable for use in this invention is of a molecular weight (as measured by the osmotic pressure method) of the order of 2,000 to 100,000, preferably of the order of 5,000 to 20,000.

2. Addition of Ethyleneimine

The addition of the ethyleneimine with respect to the polyaminepolyamide of the above described character, in general, is promoted by means of an acid catalyst. Examples of suitable acids are inorganic acids such as sulfuric acid and hydrochloric acid and organic acids such as acetic acid and butyric acid. The catalytic quantity of the acid is of the order of, for example, 0.1 to 10 percent by weight of the ethyleneimine. The addition reaction is generally carried out in a system of solution state, and the reaction temperature is ordinarily of the order of from room temperature to 100° C.

The proportion of the polyaminepolyamide to the ethyleneimine is preferably of the order of from 9/1 to 1/9 in terms of polymerization proportion or ratio.. When this ratio exceeds 9/1, the ink adhesion becomes unsatisfactory. On the other hand, when this ratio is less than 1/9, the use of an aqueous solution of the resulting ethyleneimine adduct gives rise to an increase in the tendency of peeled-off filler particles to aggregate, whereby coating of the synthetic paper over a long period becomes impossible.

The ethyleneimine adduct of the polyaminepolyamide obtained in this manner, in general, is soluble in water.

A polyaminepolyamide-ethyleneimine adduct is known and is available on the market, for example, as "Polymine SN" which is an aqueous solution of a solid content of 30 percent by weight manufactured by BASF A.G. of West Germany.

3. Coating Bath

The coating bath liquor is an aqueous solution containing the above described copolymer. While the solvent ordinarily consists of only water, it may be a mixture of water with a water-soluble organic solvent such as an alcohol or a ketone as long as a solution in the mixed solvent of this copolymer is formed.

This aqueous solution of the copolymer may contain any of various kinds of auxiliary materials. One typical example of such an auxiliary material is a water-soluble polymer, particularly a surface active polymer, i.e., a high-molecular surface active agent. By additionally using a high-molecular surface active agent, an antistatic effect can also be imparted concurrently. The high-molecular surface active agent may be cationic, non-ionic, or ampholytic. Examples of the high-molecular or polymeric surface active agents are disclosed in, for example, British patent specification No. 1,403,237 which is incorporated herein by reference. and include copolymers comprising a quaternized monomer as described later.

Other examples of auxiliary materials which can be contained in the aqueous solution of the above described copolymer are inorganic salts, particularly water-soluble inorganic salts, especially water-soluble inorganic salts of weak acids and strong alkalis. By adding a water-soluble inorganic salt of a weak acid and a strong alkali, the wetting of the high-molecular surface active agent with respect to the synthetic paper becomes good, whereby the high-molecular surface active agent is applied uniformly on the surface of the synthetic paper, and, at the same time, the antistatic effect is increased. Furthermore, a water-soluble inorganic salt of this character also performs the function of a synergistic agent for improving ink adhesion. Specific examples of such inorganic salts are sodium carbonate, sodium hydrogencarbonate, potassium carbonate, and sodium acetate. The same effect as described above can be obtained also by adding a small quantity of a strong alkali such as sodium hydroxide or potassium hydroxide and adjusting the pH of the aqueous solution to a value of 8 to 10.

In addition, the aqueous solution of the copolymer may contain a filler, a dye or pigment, a brightener, an antistatic agent other than that mentioned above, an ultraviolet absorber, an ink dryer, an ink transfer agent, and other additives. In particular, by adding a small quantity (of the order of 0.01 to 1 percent) of a fine filler (i.e., an inorganic filler, of a particle size of 0.1 to 10 microns, such as calcium carbonate, a clay, diatomaceous earth, an acidic clay, titanium oxide, barium sulfate, and talc), lowering of the slip characteristic of the synthetic paper can be prevented.

The composition of the coating bath liquor, considered as an aqeuous solution, is generally as set forth below with quantities expresed in percent by weight.

Copolymer :0.1 to 2%, preferably 0.2 to 1%

High-molecular surface active agent:0 to 2%, peferably 0.5 to 1.5%

Inorganic compounds:0 to 0.8%, preferably 0.03 to 0.6%. corresponding to 1/20 to 1/5 of the sum of the quantities of the copolymer and the high-molecular surface active agent.

4. Coating of the Synthetic Paper Pretreatment

The synthetic paper which is the subject matter of this invention has an amply high adhesion thereto of the polyaminopolyamide-ethyleneimine adduct because of the unique structure of its papery layer. However, in order to improve the wetting characteristic of the paper with respect to the aqueous solution, which is the preferable form in which this copolymer is applied, and the adhesion thereto of this copolymer, and, further, for removal of the filler particles immediately before becoming free or peeling off, the surface of the papery layer can be subjected to a suitable pretreatment.

Examples of suitable pretreatments are an electrical process such as corona discharge treatment; a thermal process such as flame treatment; a chemical process such as dichromic acid treatment, an acid treatment; and a mechanical process such as vacuum treatment.

Coating

The application of the aqueous solution of the polyamidepolyamide-ethyleneimine adduct can be carried out by any mode of practice ordinarily resorted to in the art. Examples of possible techniques are contact methods using an air knife, a size press, a roll coater, or the like and noncontact methods such as the mist method.

The quantity of application can be selected at will in a range thereof wherein the desired results can be obtained. In general, this quantity is of the order of 0.01 to 0.5 gram/square meter (g/m$^2$) on the basis of the polyaminepolyamide-ethyleneimine. We have found that when this quantity is less than 0.01 g/m$^2$, the effect of improving the ink adhesion is deficient. On the other hand, when this quantity exceeds 0.5 g/m$^2$, it gives rise to undesirable tendencies such as deterioration (i) of the good papery state of the papery layer comprising the stretched resin film containing a filler, (ii) of the ink drying characteristic, (iii) of the ink transfer characteristic, (iv) of the reverse trapping characteristic, and (v) of non-strippability of undried ink inscription by a blanket roll.

After coating, the coating layer is dried, whereupon a synthetic paper of excellent ink adhesion is obtained.

5. Products

A synthetic paper product of the simplest construction indicating the principle of this invention is illustrated in cross section in FIG. 1. This product comprises a layer 1 which is a synthetic paper substrate composed of only a papery layer of a filled stretched film and a layer 2 for improving ink adhesion which is provided on one surface of the substrate layer 1. Both surfaces of the substrate layer 1 can of course be coated with the layer 2.

Figure 2:
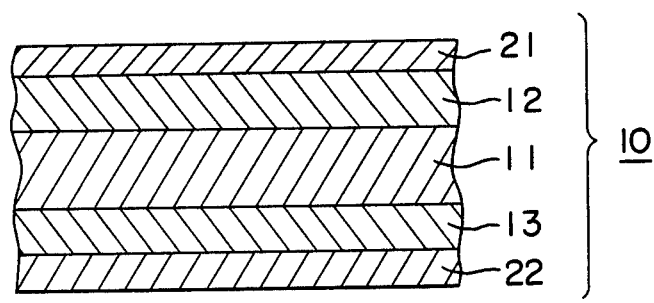

In another example of a synthetic paper product according to this invention as illustrated in cross section in FIG. 2, a synthetic paper substrate 10 of three-ply structure comprising a middle layer 11 and papery layers 12 and 13 provided on respective opposite sides of the middle layer 11 is provided on its opposite sides with layers 21 and 22 for improving ink adhesion.

6. Examples of Practice

In order to indicate more fully the nature and utility of this invention, the following specific examples of practice constituting preferred embodiments of the invention and comparison examples are set forth, it being understood that these examples are presented as illustrative only and that they are not intended to limit the scope of the invention. Throughout the following examples, all quantities expressed by percent (%) and parts are by weight unless otherwise specified.

EXAMPLE 1

A sheet is formed from a composition comprising in mixed state 8 percent of clay of a particle size of 2 microns, 3 percent of diatomaceous earth of a particle size of 5 microns, 89 percent of polyproylene, and an oxidation preventing agent. The sheet is stretched to a length 5 times the original length (that is, "stretched 5 times") in a direction which will be taken as the longitudinal direction. Onto both surfaces of this sheet thus uniaxially stretched, a composition comprising 40 percent of clay of a particle size of 2 microns and 60 percent of polypropylene is extruded from an extruder and thus secured as laminated layers. The resulting laminated layer sheet is stretched 7 times in the transverse direction, perpendicular to the longitudinal direction, whereupon a synthetic paper (Sample A) having a papery layer on each of its two sides is obtained.

In an actual instance of practice, this synthetic paper was subjected to a corona discharge treatment with an intensity of 50 w/m$^2$·minute. The synthetic paper thus treated (Sample B) was coated with an aqueous solution containing 0.5 percent of "Polymine SN", 1.5 percent of an amphoteric high-molecular surface active agent which is a polymer of the formula: under the code number ST 1000, described hereinbelow, as disclosed in Japanese Patent Application No. 48248/1971, and 0.2 percent of Na$_2$CO$_3$. The solution coating thus applied was thoroughly dried (Sample C).

The synthetic paper thus obtained exhibited the following properties, and its characteristics such as ink adhesion, aggregation characteristic of filter particles at the time of application, and adhesion of polyethylene laminate were as set forth in Table 1.

Synthetic paper apparent density : 0.78 g/cm$^3$
apparent voids: 30%
K & N ink absorptivity: 20

This synthetic paper was found to have properties which were superior to those of other samples with which it was compared.

As products for comparison, a synthetic paper in which polyethyleneimine was used in place of the above mentioned "Polymine SN" (Sample D) and a paper in which only a high-molecular surface active agent was used was applied as a coating (Sample E) were used. The properties of these comparison products are given in Table 1.

Table 1

| Sample | Ink Adhesion | | | | Anti-static | Aggregation of filler | Polyethylene laminate adhesion | Bonding by means of adhesive |
| | Gravure | Silk | Flexo-graphic | Off set | | | | |
| --- | --- | --- | --- | --- | --- | --- | --- | --- |
| A | xx | xx | xx | xx | xx | — | x | x |
| B | Δ | x | o | Δ | xx | — | o | o |
| C | o | o | o | o | ◎ | ◎ | o | o |
| D | o | o | o | o | ◎ | xx | o | o |
| E | x | xx | Δ | Δ | ◎ | ◎ | x | x |

◎: Excellent
o : Good
Δ: Fair
x : Poor
xx : Very poor

Evaluation of Ink Adhesion:
A piece of a pressure-sensitive, adhesive cellophane tape ("Cellotape", No.1800, manufactured by Nichiban Kabushiki Kaisha, Japan) is caused to adhere to a surface of a sample synthetic paper bearing ink inscription and is then peeled off from the sample at a velocity of approximately 1 meter per second (m/sec.). The state of peeling is judged as follows.
o : No peeling of paper material and nothing sticks to adhesive tape.
Δ : A portion of the ink adheres to the adhesive tape, and the remainder is adhering to the base paper.
x : Only the ink is completely taken off by the adhesive tape, or a very small quantity of ink remains on the base paper.

EXAMPLE 2

Specimens of the synthetic paper subjected to the corona discharge treatment with an intensity of 50 W/$m^2$. minute applied on its surface (Sample B) of Example 1 were coated with an aqueous solution containing 1.5 percent of a high-molecular surface active agent of the formula: ST 1000. 0.2 percent of $Na_2CO_3$, and "Polymine SN" (same as in Example 1) in quantities as set forth in Table 2. The coating layers thus applied were dried. The quantity of the coating thus applid was 0.1 g/$m^2$.

The values of the ink adhesive strength and the water resistance of these specimens of the synthetic paper were as shown in the same table. It was found that those containing 0.1 to 2 percent of the "Polymine SN" has excellent ink adhesion and water resistance.

Table 2

| "Polymine SN" | Ink Adhesion | | Water Resistance |
|---|---|---|---|
| | Gravure | Silk | |
| 0 % | x | x | o |
| 0.1 | o | Δ | o |
| 0.2 | o | o | o |
| 1.0 | o | o | o |
| 2.0 | o | o | o |
| 3.0 | o | o | x |

Water Resistance Evaluation:
After immersion in water for 24 hours, ink adhesion test carried out with press-sensitive adhesive cellophane tape.

EXAMPLE 3

A laminated sheet was made similarly as in Example 1, and by stretching specimens of this laminated sheet under various conditions, samples of synthetic paper of different ink absorptivities were prepared. Samples were prepared by subjecting some of these specimens of synthetic paper to corona discharge treatment at 50 W/$m^2$·minute, while other samples were prepared by coating specimens thus treated with corona discharge with an aqueous solution containing 0.5 percent of "Polymine SN" (same as in Example 1), 1.5 percent of a high-molecular surface active agent of the formula: ST 1100, and 0.2 percent of $Na_2CO_3$ and drying the coating thus applied. The ink adhesion and the "K & N" ink absorptivity are as set forth in Table 3. It was found that, even in the case of samples of high ink absorptivity, the ink adhesion was improved by the coating application.

Table 3

| Sample | Apparent Voids of Surface Laminated Layer | K&N Ink Absorptivity | Ink Adhesion | |
|---|---|---|---|---|
| | | | Corona discharge | Corona discharge plus coating |
| F | 40 | 25 | Δ | o |
| G | 30 | 20 | Δ | o |
| H | 10 | 5 | Δ~o | o |
| I | 3 | 3 | o | o |

Comparison Example

Specimens of the synthetic paper of Example 1 were subjected to the following surface treatments.

Sample J: coated with an aqueous solution of 1.5 percent of a high-molecular surface active agent of the formula: ST 1000, 0.2 percent of $Na_2CO_3$, and 0.5 percent of polyethyleneimine.

Sample K: coated with an aqueous solution of 1.5 percent of a high-molecular surface active agent of the formula: ST 1000, 0.2 percent of $Na_2CO_3$, and 0.5 percent of "Polyamine SN".

The ink adhesion and the state of precipitates of the solution after a 10-hour coating operation were as set forth in Table 4.

Table 4

| Sample | Ink Adhesion | Precipitate |
|---|---|---|
| J | o | White precipitate formed |
| K | o | None |

EXAMPLE 4

A sheet was formed from a mixture of 24 percent of calcium carbonate of a particle size of 2 microns, 66 percent of polypropylene, and 10 percent of polyethylene. By stretching this sheet 4 times in the longitudinal direction and 6 times in the transverse direction, a synthetic paper of a single layer structure was obtained. The ink adhesion to this synthetic paper when surface-treated was found to be as shown in Table 5.

Table 5

| Surface Treatment | | Ink Adhesion |
|---|---|---|
| Corona discharge 50W/$m^2$. min. | | Δ |
| Corona discharge "Polymine SN" | | |
| High-molecular surface active agent* | 1.5% | |
| $Na_2CO_3$ | 0.2% | o |

*The formula: ST 1100.

EXAMPLE 5

The Sample B obtained in Example 1 was coated with an aqueous solution containing 1.5 percent of a high molecular cationic surface active agent having the formula:

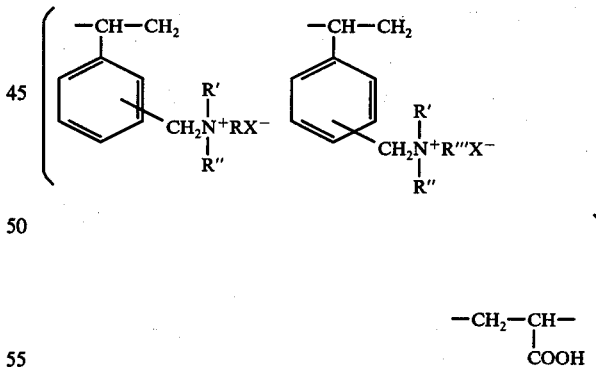

wherein R represents $CH_3$, R' and R" each represent $CH_3$, and R''' represents $C_{18}H_{37}$ and 0.2 percent of $Na_2CO_3$ and was then amply dried thereby to prepare a sample (Sample L).

Adhesion tests with adhesives for natural papers and an aqueous ink were carried out with respect to this Sample L, the aforedescribed Samples B and C, and a sample obtained by coating the Sample B with a 0.5-percent aqueous solution of "Polymine SN" (Sample M). The results were as set forth in Table 6.

Table 6

| Sample | Antistatic character | Ricepaste on the market | Starch paste | Gelatine | Gum arabic | Aqueous ink |
|---|---|---|---|---|---|---|
| B | x | x | x | Δ | Δ | x |
| C | o | o | o | o | o | o |
| L | o | x | x | x | x | x |
| M | x | o | o | o | o | o |

Symbols:
x : Poor
Δ : Fair
o : Excellent

As is apparent from this result, the Samples C and M according to this invetion have good adhesion thereto.

It is to be noted that the Samples B and M have poor antistatic characteristic.

EXAMPLE 6

An ordinary postage stamp (a 1-yen stamp of Japan) was pasted onto each of Samples C and L prepared as specified in Examples 1 and 5 and onto a natural paper. Then, by means of a "Tensilon Model 3-" manufactured by Toyo Sokki Co., Japan, tension tests were carried out on these test specimens thereby to measure their strengths in resisting peeling of the postage stamps.

The results were as set forth in Table 7.

Table 7

| Sample | Resistance to Peeling (g) |
|---|---|
| L | 120 |
| C | 415 (Back of stamp started to tear) |
| Natural paper | 200 |

To Sample C of this invention, the stamp adhered very tenaciously.

EXAMPLE 7

A Sample N was prepared by coating the surface of the Sample B of Example 1 with an aqueous solution containing 1.5 percent of a high-molecular surface active agent of the formula: ST 1100, 0.2 percent of $Na_2CO_3$, 0.2 percent of kaolin clay of an average particle size of 1.2 microns, and "Polymine SN" (same as that in Example 1). The blocking characteristics and the slip characteristics of this Sample N and the aforedescribed Samples B and C were evaluated as described below and compared. Results as shown in Table 8 were obtained.

Table 8

| Test Conditions Measurement items Sample | Relative Humidity 40% | | Relative Humidity 60% | | Relative Humidity 80% | | Relative Humidity 90% | |
|---|---|---|---|---|---|---|---|---|
| | Slip characteristic | Block characteristic | Slip characteristic | Block characteristic | Slip characteristic | Block characteristic | Slip characteristic | Block characteristic |
| B | Δ | o | Δ | o | Δ | o | Δ | o |
| C | o | o | Δ | Δ | x | x | x | x |
| N | o | o | o | o | o | o | o | o |

Blocking Test

Several tens of samples each cut to 10 × 20 cm. size are stacked and left standing at 25° C in a humid atmosphere and under a pressure of 50 kg/cm² for 30 minutes. Thereafter, the pressure is removed, and the ease of separation sheet-by-sheet is judged.
x : Sheets do not separate one-by-one
Δ : Sheets separate somewhat with sound
o : Sheets easily separate.

Slip Characteristic Test

Under the same conditions as in the blocking test, several sheets of samples are stacked and placed under pressure for 30 minutes. Thereafter, the stack is pressed at top and bottom by hand and subjected to a lateral shear stress such as to cause latral slippage.
x : Difficult in slipping (i.e., high resistance to slippage)
Δ : Slightly difficult in slipping
o : Easily slipping.

Sample B exhibited poor antistatic property, and the test results indicate that its slip characteristic is somewhat low.

EXAMPLE 8

Preparation of Ethyleneimine Adduct

An ethyleneimine adduct was prepared in the manner described below from a polyaminepolyamide in which triethylenetetramine was used to replace "Polymine SN", which is said to be an ethyleneimine adduct of a polyaminepolyamide whose polyalkylenepolyamine component is diethylenetriamine.

318 g(2.18 mol) of triethylenetetramine to which 100 g of water had been added was placed in a three-neck flask provided with an agitator, a thermometer, and a cooling tube. To these contents of the flask, 292 g (2.pmol) of adipic acid was added, and, after this had dissolved in the amine aqueous solution, the interior of the flask was heated up to 130° C in approximately 30minutes. Together with removal of water, the temperature was gradually raised to 190° C. Then, after evaporating off 134g of water over approximately 6hours, the interior of the flask was cooled to 140° C, and then 380 g of water was added thereby to obtain a polyaminepolyamide solution (solid content 50%. This is designated solution B.

100 g of this solution B was placed in a five-neck flask provided with an agitator, a thermometer, a nitrogen introducing pipe, a dropping funnel, and a cooling tube. To this acetic acid was added to adjust the pH to 7. Furthermore, 4.5 g of paratoluene sulfonic acid was added. Then, after the interior of the flask was thereafter purged with nitrogen, 45 g of ethyleneimine was added, and the system was heated to 45° C and caused to react for 1 hour. Thereafter, 105 g of ethyleneimine was dropped over 1 hour into the system, and the reaction was continued for 3 hours. The temperature was thereafter raised, and refluxing was carried out for 2 hours.

Upon completion of the reaction, the pH was adjusted to 5 with hydrochloric acid, and water was added to set the solid content at 25 percent. The polyaminepolyamide/ethyleneimine ratio by weight in the ethyleneimine adduct thus obtained was 1/3.

The above solution was applied as a coating on the Sample B of Example 1 (in a coating quantity, as solid content, of 0.1 g/m², whereupon a synthetic paper of excellent ink adhesion was obtained.

The polymeric surfactant shown in British Patent Specification No. 1,403,237 is a copolymer of a hydrophobic monomer with from 5 to 95 percent of an amphoteric monomer of the formula:

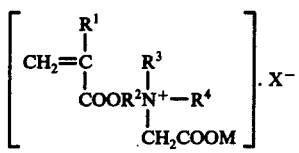

wherein R¹ is H or CH₃, R² is a lower alkylene, each of R³ and R⁴ is independently a saturated or unsaturated alkyl of at least 1 carbon atom, an acylaminoalkyl, a hydroxylalkyl, an alkoxyalkyl, a polyoxyalkylene, or an aryl, M is a cation residue and X is an anion residue.

The polymeric surfactant under the code number ST 1000 is a copolymer consisting essentially of monomeric species of:

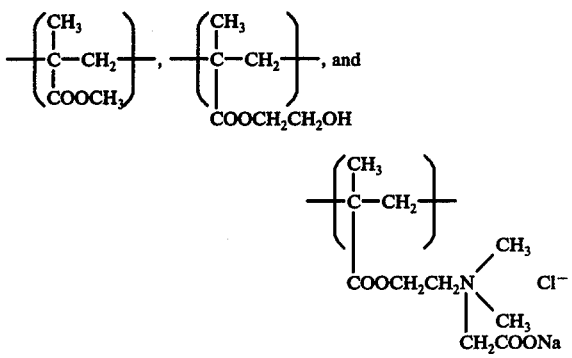

The polymeric surfactant under the code number ST 1100 is a copolymer consisting essentially of monomeric species of:

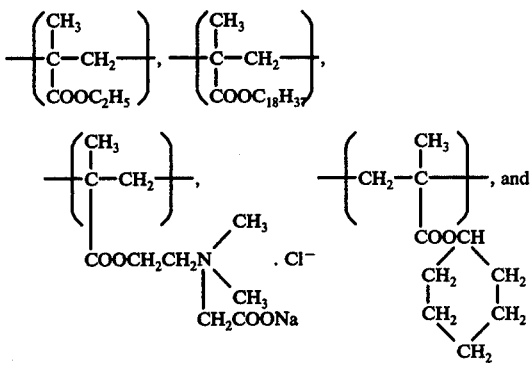

-continued

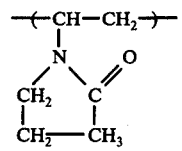

We claim:

1. A synthetic paper having good ink adhesion thereto which comprised:
   A. a synthetic paper substrate comprising a papery layer which is a stretched resin film which contains fine filler particles dispersed therein and has microvoids dispersed therein and surface ruptures thereon; and
   B. a layer for improving ink adhesion to the synthetic paper which is provided on at least one surface of the papery layer and comprises, as an essential constituent, an ethyleneimine adduct of a polyaminepolyamide.

2. A synthetic paper as claimed in claim 1 in which the synthetic paper substrate comprises the papery layers provided on the both sides of an inner layer.

3. A synthetic paper as claimed in claim 1 in which the ethyleneimine adduct is water-soluble resin resulting from the addition of an ethyleneimine to a polyaminepolyamide.

4. A synthetic paper as claimed in claim 3 in which the polyaminepolyamide is obtained by a condensation reaction of a dicarboxylic acid and a polyalkylenepolyamine.

5. A synthetic paper as claimed in claim 4 in which the dicarboxylic acid is a member selected from the group consisting of saturated and unsaturated, aliphatic and alicyclic dicarboxylic acids and aromatic dicarboxylic acids each having from 3 to 10 carbon atoms.

6. A synthetic paper as claimed in claim 5 in which the dicarboxylic acid is a saturated aliphatic dicarboxylic acid having from 4 to 8 carbon atoms.

7. A synthetic paper as claimed in claim 5 in which the dicarboxylic acid is phthalic acid.

8. A synthetic paper as claimed in claim 4 in which the polyalkylenepolyamine is a member selected from the group consisting of polyalkylenepolyamines with alkylene moieties each having from 2 to 4 carbon atoms.

9. A synthetic paper as claimed in claim 8 in which the polyalkylenepolyamine is a polyethylenepolyamine.

10. A sythetic paper as claimed in claim 4 in which the polyaminepolyamide is a member selected from the group consisting of condensation products of adipic acid with a polyethylenepolyamine selected from the group consisting of diethylenetriamine, triethylenetetramine and tetraethylenepentamine.

11. A synthetic paper as claimed in claim 1 in which the layer for improving ink adhesion contains a high molecular surface active agent.

12. A synthetic paper as claimed in claim 1 in which the layer for improving ink adhesion further contains an inorganic salt which is soluble in water.

13. A synthetic paper as claimed in claim 12 in which the inorganic salt is a carbonate or a bicarbonate.

* * * * *